(No Model.)  2 Sheets—Sheet 1.

P. H. FONTAINE.
MACHINE FOR DISTRIBUTING FERTILIZER AND PLANTING SEED.

No. 457,612.  Patented Aug. 11, 1891.

Witnesses:
J. P. Thos. Lang
Edward T. Fenwick

Inventor:
Patrick H. Fontaine
by his Attorney
Mason, Fenwick & Lawrence (No Model.) 2 Sheets—Sheet 2.
P. H. FONTAINE.
MACHINE FOR DISTRIBUTING FERTILIZER AND PLANTING SEED.
No. 457,612. Patented Aug. 11, 1891.
Fig 3.
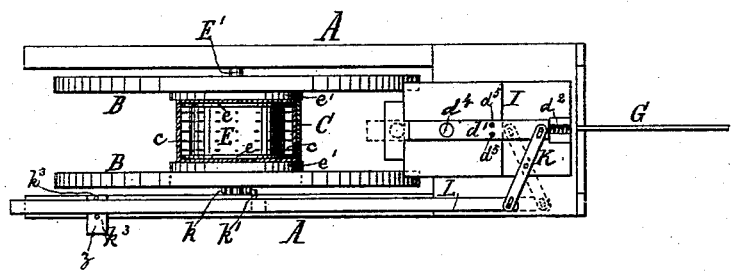
Fig 4.    Fig 5.    Fig 6.
  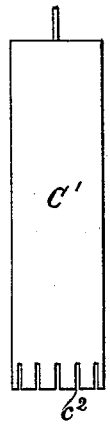
Fig 7.
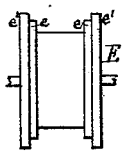
Witnesses:      Inventor:
J. P. Theo Lang.      Patrick H. Fontaine
Edmund J. Fenwick      by his attorneys
     Mason, Fenwick & Lawrence

UNITED STATES PATENT OFFICE.

PATRICK H. FONTAINE, OF ELMO, VIRGINIA.

MACHINE FOR DISTRIBUTING FERTILIZER AND PLANTING SEED.

SPECIFICATION forming part of Letters Patent No. 457,612, dated August 11, 1891.

Application filed September 17, 1890. Serial No. 365,263. (No model.)

*To all whom it may concern:*

Be it known that I, PATRICK H. FONTAINE, a citizen of the United States, residing at Elmo, in the county of Halifax and State of Virginia, have invented certain new and useful Improvements in Machines for Distributing Fertilizers and Planting Seed; and I do hereby declare the following to be a full, clear, and exact description of the invention, such as will enable others skilled in the art to which it appertains to make and use the same.

My invention relates to a machine for distributing fertilizers and planting seed; and it consists in certain novel constructions and combinations of parts in a fertilizer-distributer and in a seed-planting mechanism combined therewith, as will be hereinafter described.

Figure 1:
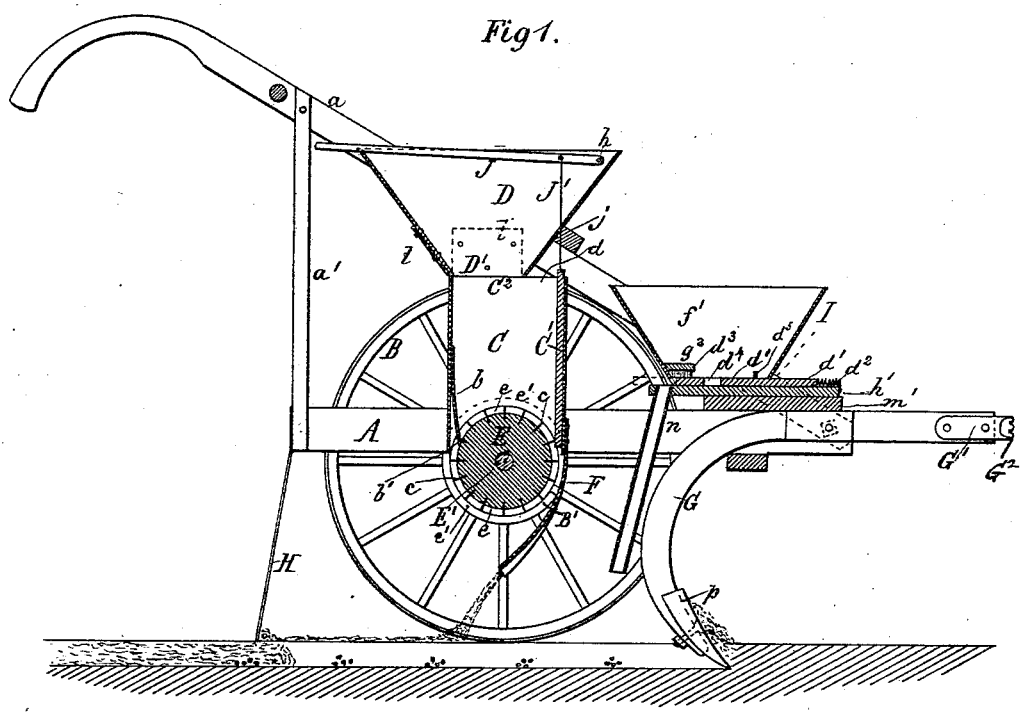
Figure 2:
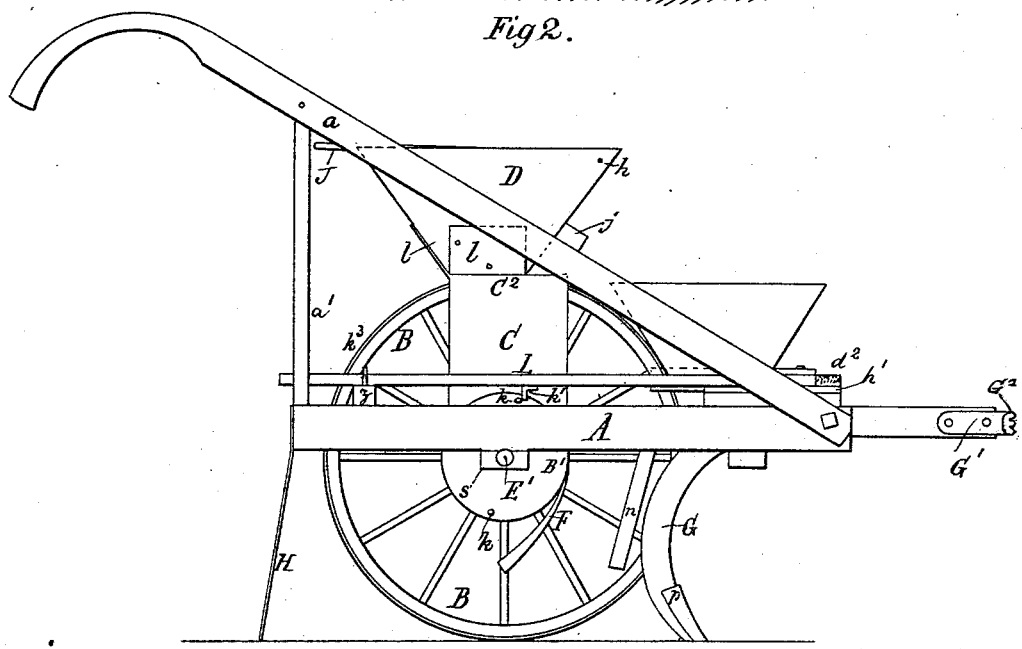

In the accompanying drawings, Figure 1 is a vertical longitudinal section of the improved fertilizer-distributer and seed-planter. Fig. 2 is a side elevation, and Fig. 3 a top view, of the same. Figs. 4, 5, 6, and 7 are details of the machine.

A designates the frame, of any appropriate form and construction.

B B are wheels shown with spokes, but preferably made out of solid wood bound with a light iron band, and supported on a revolving axle E', having its bearings in boxes $s$ of the frame. These wheels should have suitably-sized hubs B', wherein are provided horizontally-projecting pins $k$, for a purpose presently described. On the axle between its hubs a fertilizer-distributing roller E is applied and secured by a key or other suitable means. At each end of this roller annular angular shoulders or flanges $e\ e'$ are provided, the shoulders $e'$ forming a seat for the feed-box C, while the shoulders $e$ form a deep conducting groove or channel extending across from flange to flange and all around the periphery of the roller. In the periphery of the roller between the shoulders or flanges $e\ a$ series of rows of radial agitating-pins $c$ are provided, said pins being about the same height, or less, as the flanges. The roller is inclosed at its ends and at front and rear for about one-half of its diameter above the axle E by means of the feed-box C, which fits between the flanges $e'$ and rests upon the flanges $e$, and it has a longitudinal internal diameter a little greater than the diameter of the roller. This feed-box is of considerable depth above the roller and is surmounted by a supply-hopper D, which has a throat D' of very considerable less diameter than the upper receiving end $C^2$ of the feed-box, and at the junction of the supply-hopper with the feed-box an inspection or "peep" opening $d$ is provided, the same being forward of the hopper. The hopper is connected to the feed-box by the plates $l$ of the feed-box, and is sustained by a cross-bar $j$ of the handles $a$ of the frame, said handles being connected at their forward ends to the side of said frame, and supported near their rear ends by standards $a'$, extending up from the frame. The feed-box has vertical side and end walls. The flanges $e\ e'$ of the roller E also have vertical inner side surfaces. At the rear of the roller is provided a yielding guard $b$, which fits between the vertical surfaces of the flanges and bears against the periphery of the roller. This guard has spaces $b'$ formed in its lower edge for the passage by it of the pins $c$, and its office is to prevent the discharge of fertilizer at the rear of the feed-box and to scrape from the feed-roller wet guano which may adhere to it. On the inner side of the front walls of the feed-box, close to the roller, a vertical slotted feed-discharge gate C' is arranged, and it is moved up and down for the purpose of regulating the amount of guano to be discharged at the front of the feed-box, the slots $c^2$ in its lower end serving for the passage of the pin $c$. This gate is operated by means of a lever J and a connecting-rod J', the lever being connected to the hopper at $h$ or to any other part of the frame of the machine, as found most convenient. By depressing the long arm of the lever or raising the same the amount of the discharge of guano may be regulated as required. In front of the roller and just below the gate C' a backwardly-curved double-grooved or centrally-ridged conducting and discharging apron F, made of tin, zinc, or other flexible material, is arranged so as to direct the fertilizer backward in two streams, so that the fertilizer falls on each side of the seed instead of upon it and to a point directly under or a little in rear of the center of the roller. The grooves of this conductor may be narrowed, so as to concentrate the fertilizer to any extent desired by bending the edges inward toward one another; but it is very essential that the guano shall not come directly in contact with the seed, so as to render its being burned, or its germ destroyed by rotting, liable.

It should be specially noticed that the chamber of the feed-box C above the roller is, from its receiving end $C^2$ down to its base, of greater area than the throat D' of the hopper D, and that there is consequently always sufficient room for the guano to spread in said chamber, and hence there is no possibility of the chamber of the feed-box becoming clogged by the impact of guano in hopper D upon the guano in the chamber of the feed-box, notwithstanding the entire bottom portion of the hopper D is open for the discharge of the supply-guano to the feed-box and therefrom to the distributing-roller, and consequently choking and clogging of the roller are avoided when the guano is wet. This is a very important feature of my invention. It should also be noticed that the pins $c$ of the roller, by being arranged to pass under or through the superincumbent mass of guano in the feed-box, will cause the guano to be agitated, and thus a further precaution against sticking and clogging when the guano is wet is provided. These pins in this relation are also a very important feature of the machine, and, furthermore, the construction and arrangement of the conducting-apron F, so that it turns the falling guano backward to a position where the operator can see that it is falling properly and in sufficient quantity is important, as said apron thus becomes an index whereby the farmer can see when the machine is not discharging the guano. This arrangement of the apron also insures the falling of the guano in a divided condition, so as not to fall on the grain or seed, this being accomplished by compelling the guano to slide off of inclined surfaces and in separated streams.

The machine is provided with a suitable coverer H and a curved cultivator-beam G, having a shovel G' and a clevis $G^2$. This beam is extended back so that the standard comes between the wheels B, and thus very small leverage-strain between the axle E' of the machine and the point of the cultivator is experienced. Forward of the fertilizer-distributer a seed-planting mechanism I is applied on the frame. This mechanism comprises a hopper $f''$, base-boards $m'$ and $h'$, a reciprocating horizontal slide $d'$, having a seed-receiving cell and two agitating-pins $d^5$ forward of the cell and projecting upward into the seed in the hopper, a spring $d^2$, a brush $d^3$ for brushing aside surplus seed, a connected slotted link K, a vibrating rod L, having an annular lug $k'$ applied to it, and a seed-conducting tube $n$, all as shown. The pins $d^5$ of the slide serve for stirring the seed and thereby causing the same to fall into the cell every time the slide is readjusted for a new feed. These pins will be found useful in rotary and oscillating feeders for seed-planters. The slide $d'$ of this planting mechanism is operated by wheels B, which rotate the roller E. This is effected by the pins $k$ in the hubs of the wheels coming successively in contact with the angular lug $k'$, and thereby moving the rod far enough in a longitudinal direction to cause the link K to carry the seed-cell $d^4$ of the slide $d'$ over the tube $n$, and thus effect the discharge of the seed into the seed-tube, from whence the seed passes into the furrow made by the cultivator-shovel $p$, and is covered by the coverer H after the fertilizer has been dropped on each side of it. As soon as the pin $k$ is released from the lug $k'$, the spring $d^2$ returns the slide to its normal position ready for another operation, which takes place whenever a second pin comes in contact with the lug. There may be any desired number of pins $k$ for dropping the seed at different distances apart in the row. The rod L works between two pins $k^3$, and the seed-planter is thrown out of gear by raising the end of the rod and placing it to the right or outside of the pins. It is obvious that the grooved roller, feed-box, hopper, and the adjuncts thereof might be arranged behind a propelling-wheel, and the parts operated by ordinary gearing, and also that two or more grooves might be provided in the roller.

I contemplate using the fertilizer-distributing devices for planting cotton-seed, and to this end, with very slight immaterial changes, the feed-box C, hopper D, and flanged distributing-roller E, with pin $c$ in its periphery, may be converted to such use.

I do not claim under this application the corn-planting mechanism having a slide with agitating-pins $d^5$ projecting from it separately from the fertilizer-distributing mechanism, as a separate application will be made for such separate corn-planting machine.

What I claim as my invention is—

1. In a fertilizer-distributer, in combination, a feed-box, a hopper, and a distributer, the said feed-box having a chamber extending up above the revolving distributer a considerable distance and forming a chamber of greater horizontal area than that of the throat of the hopper, substantially as described.

2. In a fertilizer-distributer, in combination, a revolving distributing-roller having an annular groove in its circumference, a feed-box having inner upright walls which extend a considerable distance above the grooved roller which forms the bottom of said feed-box, and is of a horizontal sectional area greater than the diameter of the groove in said roller, and a hopper surmounting the feed-box and having a discharging-throat of less horizontal sectional area than the feed-box, substantially as described.

3. In a fertilizer-distributer, in combination, a feed-box, a hopper, an annularly-grooved distributing-roller, and pins inserted into the periphery of said roller, the said feed-box having a chamber extending up above the revolving distributer a considerable distance and forming a chamber of greater horizontal area than that of the throat of the said hopper beneath it, substantially as described.

4. The combination of a fertilizer discharging and conducting apron arranged forward of the distributer of the machine and curved backwardly and made to extend beneath the distributer and constructed and arranged to conduct the fertilizer on each side of the middle of the furrow, substantially as described.

5. The combination of the annularly-grooved distributing-roller, feed-box having a horizontal sectional area greater than the throat of the supply-hopper D, gate C', lever J, and connection $j'$, substantially as described.

6. The corn-planting mechanism I, comprising hopper $f'$, reciprocating slide $d'$, having pins $d^5$ projecting from its upper surface, spring $d^2$, slotted link K, extending transversely and pivoted, rod L, pins $k^3$, pin or pins $k$, and lug $k'$, in combination with the frame A, axle, supporting-wheels, corn-conducting tube $n$, beam carrying a shovel, and the fertilizer-distributing roller and its hopper, substantially as described.

In testimony whereof I hereunto affix my signature in presence of two witnesses.

PATRICK H. FONTAINE.

Witnesses:
T. M. TUCKER,
ROBERT IRVIN.